United States Patent [19]

Shadeck

[11] Patent Number: 5,725,035
[45] Date of Patent: Mar. 10, 1998

[54] APPARATUS FOR ADJUSTING THE RELATIVE POSITIONS OF TWO COMPONENTS OF A POWER TOOL

[75] Inventor: Louis M. Shadeck, Timonium, Md.

[73] Assignee: Black & Decker Inc., Newark, Del.

[21] Appl. No.: 659,685

[22] Filed: Jun. 5, 1996

[51] Int. Cl.⁶ .................................................. B27C 1/02
[52] U.S. Cl. .............. 144/117.1; 144/130; 403/359; 74/441
[58] Field of Search .................. 403/359, 360; 74/424.8 R, 439, 440, 441; 144/114.1, 116, 117.1, 129, 130

[56] References Cited

U.S. PATENT DOCUMENTS

| | | | |
|---|---|---|---|
| 3,718,168 | 2/1973 | Berends | 144/116 |
| 4,328,856 | 5/1982 | Cunningham. | 403/359 |
| 4,456,042 | 6/1984 | Clark et al. | 144/117.1 |
| 4,688,441 | 8/1987 | Yasukawa et al. | 74/440 |
| 4,753,122 | 6/1988 | Nishikawa et al. | 74/441 |
| 4,943,182 | 7/1990 | Hoblingre | 403/359 |
| 5,027,671 | 7/1991 | Erikson et al. | 74/441 |
| 5,176,190 | 1/1993 | Miyamoto et al. | 144/117.1 |
| 5,577,859 | 11/1996 | Nau | 403/325 |

*Primary Examiner*—W. Donald Bray
*Attorney, Agent, or Firm*—Harness, Dickey & Pierce, P.L.C.

[57] ABSTRACT

An apparatus for adjusting the relative positions of a first component and a second component of a power tool includes a drive rod which interconnects the first and second component. The drive rod has a plurality of external threads in meshing engagement with a plurality of internal threads located on one of the first and second components. An internally threaded element preferably in the form of a backlash nut is also in meshing engagement with the plurality of internal threads. A biasing member is interdisposed between the internally threaded element and one of the first and second component. In a preferred form, the apparatus is incorporated into a power tool for woodworking or metal forming and is operative for eliminating play in the threaded interconnection of the components which is most evidence upon reversal of movement of the drive rod.

20 Claims, 4 Drawing Sheets

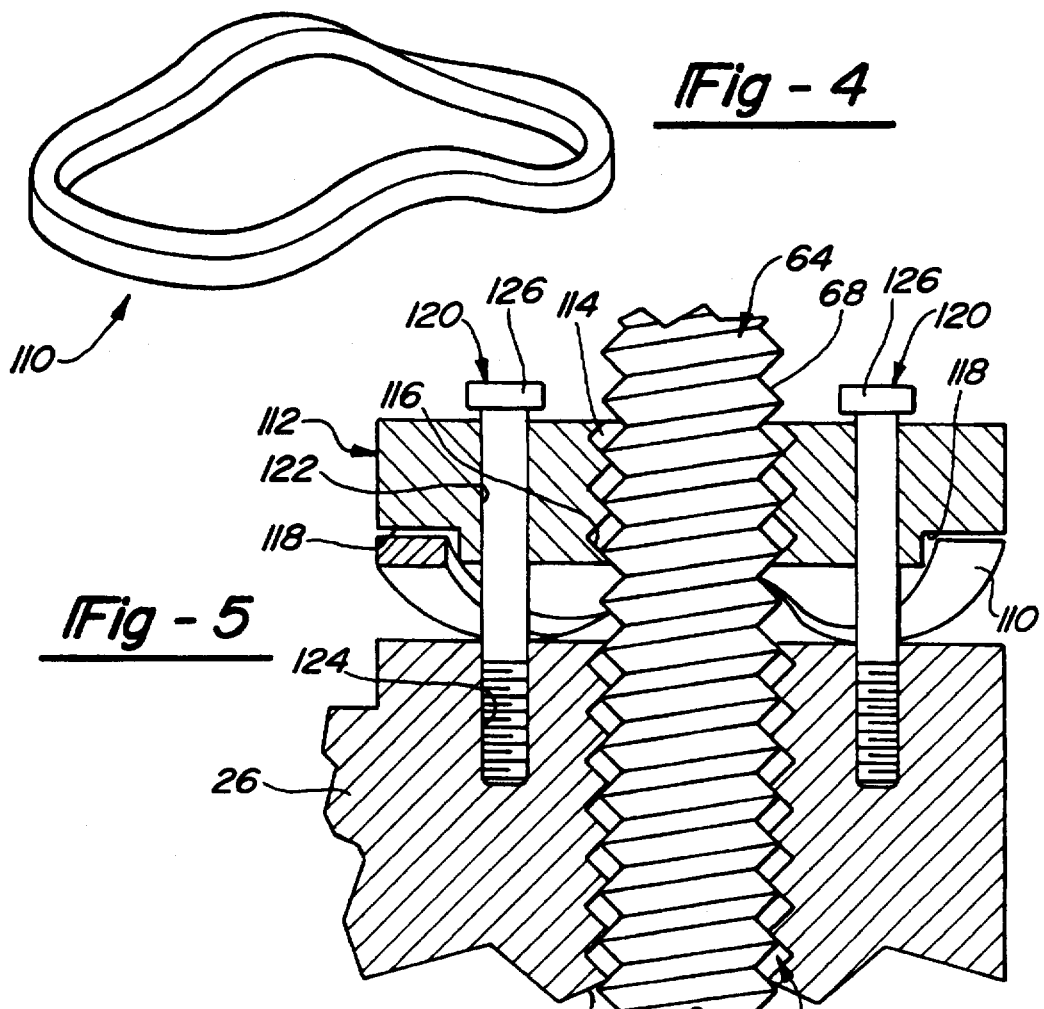
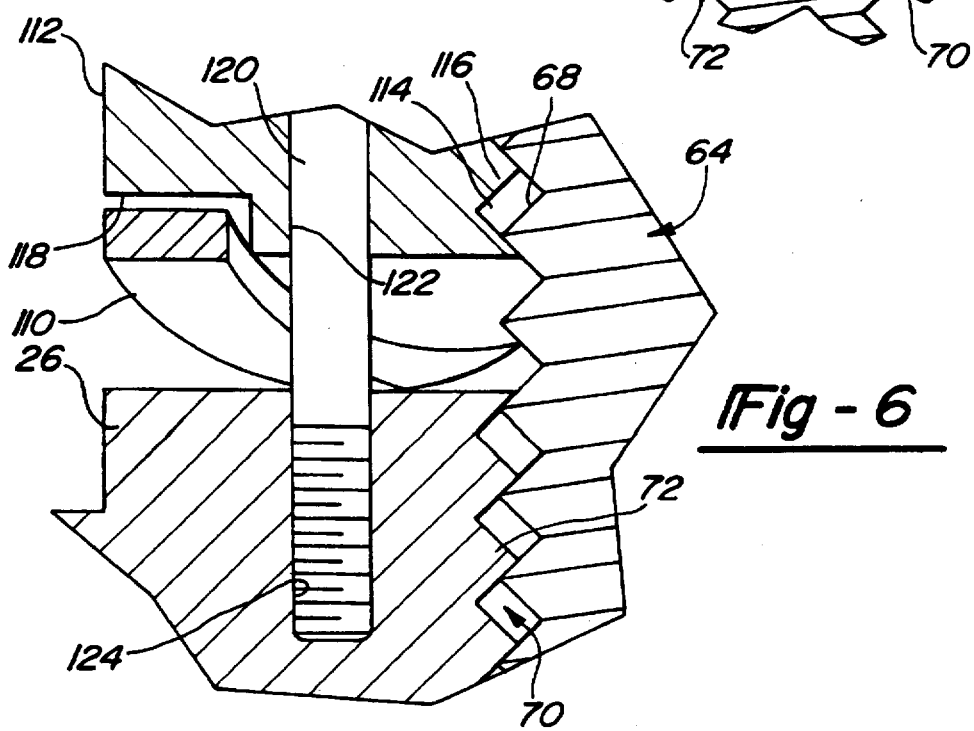

APPARATUS FOR ADJUSTING THE RELATIVE POSITIONS OF TWO COMPONENTS OF A POWER TOOL

BACKGROUND OF THE INVENTION

1. Field of the Invention

The present invention generally relates to tools or machines in which accurate, quick and easy adjustment of the relative positions of two components is desirable. More particularly, but not exclusively, the present invention relates to an apparatus for eliminating play in the threaded interconnection of mechanical elements of a power tool or machine which is most evident upon reversal of movement, otherwise known as backlash.

2. Discussion

Various power tools are used in woodworking and metal forming to efficiently and accurately shape workpieces to desired dimensions and surface qualities. Such tools often include a workpiece forming element such as a bit, cutting blade, or the like, which is adjustable relative to the workpiece. For example, the workpiece forming element, in many instances, is adjustable relative to a base plate or platen upon which the workpiece is supported. Many applications require quick and accurate adjustment of the workpiece forming element to obtain desired results.

A wood planing machine is one example of such a tool in which a workpiece forming element is adjustable relative to a workpiece. A conventional planing machine is used for the surface planing of boards and typically includes one or more rotatably mounted cutting blades attached to a vertically movable carriage assembly. In a typical wood surface planer, a selectively adjustable workpiece opening is defined between a carriage assembly and a workpiece support surface or platen. The one or more rotationally mounted cutting blades by the carriage assembly so as to be exposed adjacent to the workpiece opening. The carriage assembly is movably mounted to a plurality of support columns for movement with respect to the workpiece support surface, thereby permitting adjustment of the vertical dimension of the workpiece opening for selectively determining the amount of material to be removed from the workpiece.

Multiple passes of the workpiece through the workpiece opening are often necessary to obtain the desired thickness and surface quality. Through adjustment of the carriage assembly relative to the support surface, the amount of material removed during a single pass can be varied. Such adjustment is typically accomplished through selective rotation of a drive rod threadably engaged with the carriage assembly. As with other woodworking and metal forming operations, it is highly desirable that a planing machine accomplish workpiece preparation with precise tolerances, high surface quality, and a significant degree of reproducible results.

While many commercially successful tools are available which include an adjustable workpiece forming element that is linearly advanced by a rotatable drive rod, all are subject to improvement. Most specifically, the necessary thread clearances between the component carrying the workpiece forming element and the rotatable drive rod creates play in the interconnection therebetween which is most evident upon reversal of movement of the drive rod. As a result, actual and perceived quality of the forming operation are adversely affected since initial reversing of rotation of the drive rod functions only to take up thread clearances and does not correspondingly result in translation of the workpiece forming element.

SUMMARY OF THE INVENTION

It is a principal object of the present invention to provide a tool or machine in which the relative position of two components can be set quickly and accurately.

One particular object of the present invention is to provide a power tool for carrying out planing of the surface of a workpiece including an arrangement for eliminating play in the interconnection of a threaded drive rod and a linearly translatable component which is most evident upon reversal of movement of the drive rod, otherwise known as backlash.

A related object of the present invention is to substantially eliminate workpiece forming error that is induced by the necessary thread clearance between a movable components of a power tool and a drive rod by constantly maintaining engagement on the outboard sides of the threads.

A more specific object of the present invention is to provide a tool for carrying out forming operations on a workpiece, such as a wood planer, which incorporates an arrangement of simple and inexpensive construction to eliminate backlash and thereby enhances actual and perceived accuracy of the forming operation.

In one form, the present invention provides an apparatus for adjusting the relative positions of a first component and a second component of a power tool. The first component includes an aperture having a plurality of internal threads. The apparatus includes a drive rod interconnecting the first component and the second component. The drive rod has a plurality of external threads in meshing engagement with the plurality of internal threads. An internally threaded element is in meshing engagement with the plurality of internal threads. A biasing member is interdisposed between the internally threaded element and the second component and is in constant biasing engagement with the second component.

In another form, the present invention provides a tool for carrying out forming operations on a workpiece is provided which includes first and second components. The first component is operative for engaging the workpiece. One of the first and second components is movable relative to the other of the first and second components. The movable element includes an aperture having a plurality of internal threads. A workpiece forming element is attached to the movable element. A drive rod interconnects the first and second components and includes a plurality of external threads in engagement with the plurality of internal threads. A biasing member is in constant biasing engagement with the movable component. Constant contact is maintained between the plurality of internal threads and the plurality of external threads as the drive rod is rotated in a first direction and subsequently in a second direction.

BRIEF DESCRIPTION OF THE DRAWINGS

Additional objects and advantages of the present invention will become apparent from a reading of the following detailed description of the preferred embodiment which makes reference to the drawings of which.

5,725,035

3

Figure 2:
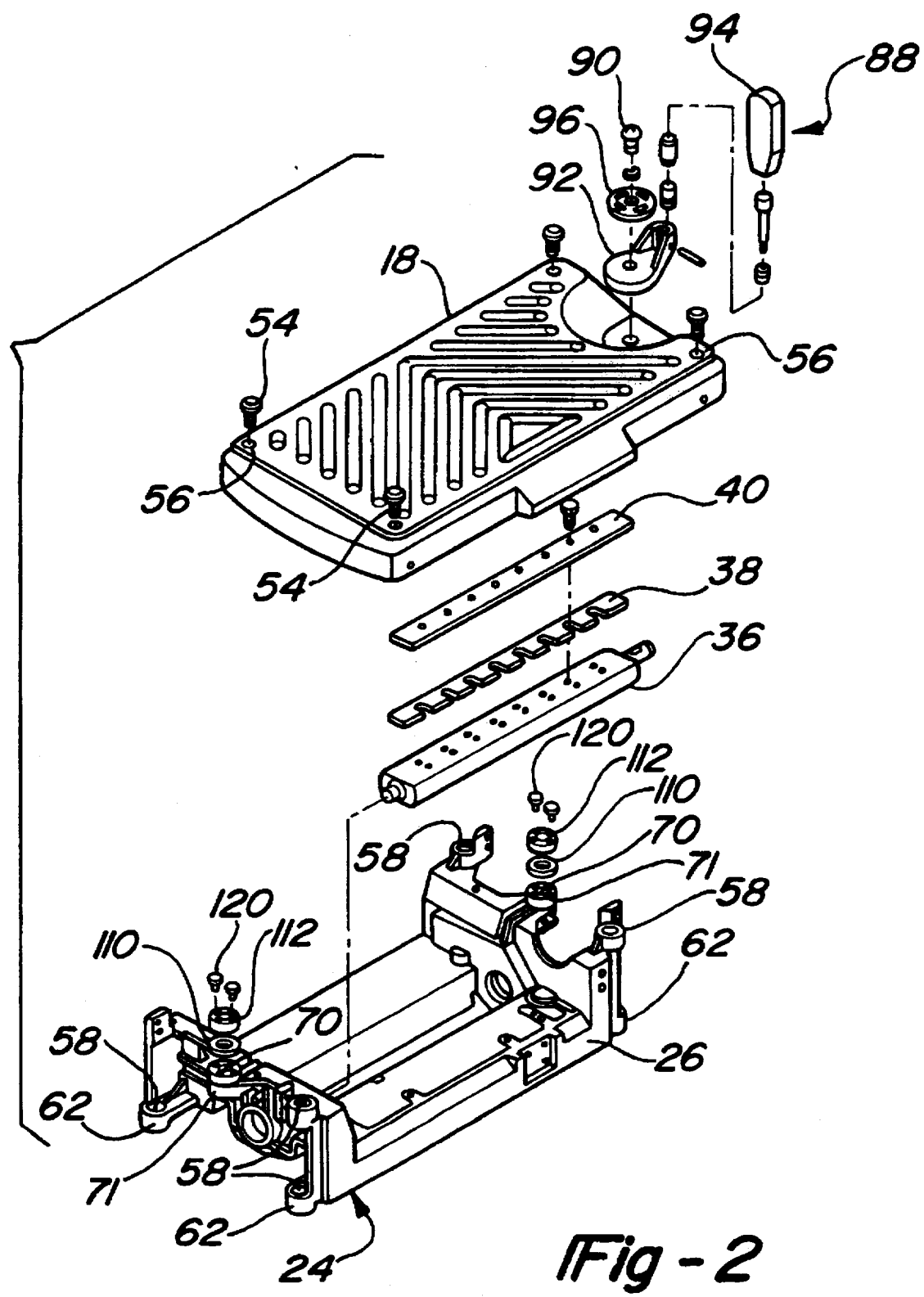
FIG. 2 is an exploded perspective view of various elements of the portable wood planing machine of FIG. 1 generally associated with an upper portion thereof.

FIG. 4 is an enlarged perspective view of the biasing member of FIG. 2;

FIG. 5 is an enlarged cross-sectional view illustrating the cooperative relationship between the biasing member, backlash nut and carriage assembly casting of FIG. 2;

FIG. 6 is a further enlarged cross-sectional view similar to FIG. 5, illustrating the engagement of the external threads of the drive rod with the internal threads of the backlash nut and carriage assembly casting.

DETAILED DESCRIPTION OF THE PREFERRED EMBODIMENT

As required, a detailed embodiment of the present invention is disclosed herein. However, it is to be understood that the disclosed embodiment is merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

The present invention is broadly applicable to various power tools of the type including an adjustable component which carries a workpiece forming element. The adjustable component is linearly translatable in response to rotation of a threaded drive rod. Before addressing the specific details of the present invention, a brief understanding of an exemplary power tool incorporating the teachings of the present invention is warranted.

Figure 1:
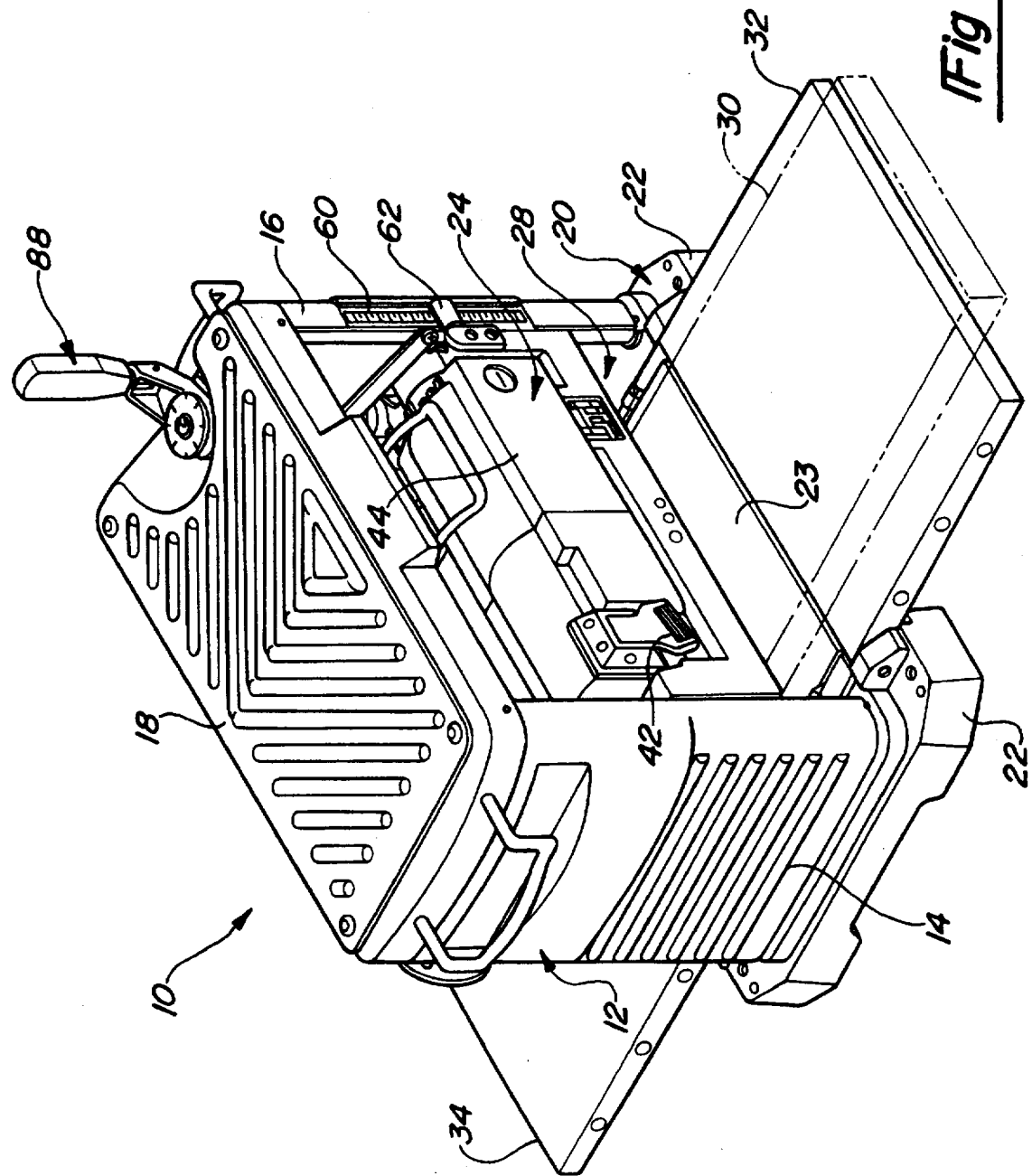
FIG. 1 is a perspective view of a portable wood planing machine constructed to incorporate an apparatus for eliminating the play between threadably interconnected components in accordance with a preferred embodiment of the present invention.
Figure 3:
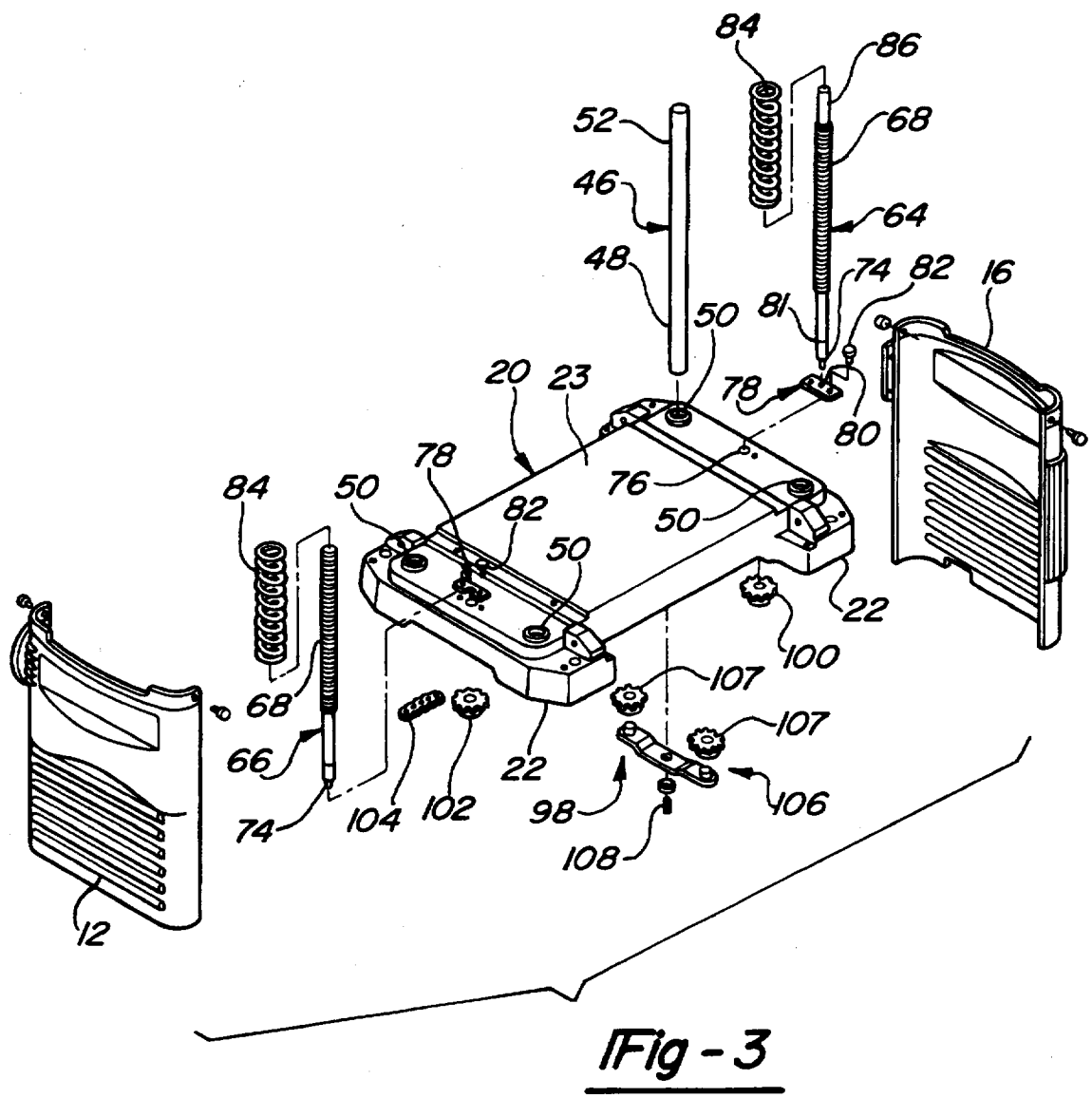
FIG. 3 is an exploded perspective view of various elements of the portable wood planing machine of FIG. 1 generally associated with a lower portion thereof.

Turning to the drawings in which identical or equivalent elements have been denoted with like reference numerals and specifically to FIGS. 1 through 3 thereof, an exemplary power tool is illustrated as a portable wood planing machine. The portable wood planing machine is identified generally at reference numeral 10. In addition to the following, a further description of various features of the illustrated portable wood planing machine 10 not directly related to the present invention is provided in co-pending application Ser. No. 08/659,684, filed concurrently herewith on Jun. 5, 1996, which is hereby incorporated by reference as if fully set forth herein.

The planing machine 10 is shown to generally include a frame 12 having a pair of opposing sides 14 and 16, a top 18 and a base 20. The base includes a pair of support feet 22 and a workpiece support surface or platen 23. The planing machine 10 is also shown to include a carriage assembly 24 having an integrally formed casting 26. The carriage assembly 24 and the base 20 cooperate to define a workpiece opening 28 for receiving a workpiece 30. In one application, the workpiece opening 28 of the portable wood planing machine 10 is sized to accommodate a workpiece having a nominal width of twelve and one-half inches or less. The planing machine 10 also includes forwardly extending and rearwardly extending feed tables 32 and 34 for further supporting the workpiece 30. In FIG. 1, the workpiece 30 is shown in broken lines partially extending within the workpiece opening 28.

As shown in the exploded view of FIG. 2, a cutter head 36 is carried by the carriage assembly 24 such that it is exposed adjacent an underside of the carriage assembly 24 which is adjacent the workpiece opening 28. The carriage assembly 24 also carries a pair of feed rollers (not shown). Rotational attachment of the cutter head 36 and the feed rollers to the carriage assembly 24 is accomplished in a substantially conventional manner. The cutter head 36 includes a replaceable cutting blade 38 removably secured

4 by a retention plate 40 and is driven by a motor (not shown) located within the carriage assembly 24. An on/off switch 42 extending from the front face 44 of the carriage assembly 24 controls the supply of electric power to the motor from a power cord (not shown).

With specific reference to the exploded views of FIGS. 2 and 3, the carriage assembly 24 is shown to be slidably mounted to a plurality of support columns or support posts for bi-directional vertical movement. FIG. 3 illustrates one of the support columns which has been identified with reference numeral 46. Each of the plurality of support columns 46 is generally cylindrical and includes a lower end 48 which engages a circular recesses 50 formed in the base 20 of the frame 12. The support columns 46 also include upper ends 52 which engage similar recesses (not shown) formed in the underside of the top 18. Threaded fasteners 54 pass through apertures 56 in the top 18 and base 20 and engage tapped holes (not shown) in the upper and lower ends 48 and 52 of the support columns 46. In the embodiment illustrated, four support columns 46 support the carriage assembly 24. The carriage assembly 24 may selectively be translated upward or downward along a path of travel and is guided by integrally formed apertures 58 located in the four corners of casting 26 of the carriage assembly 24.

As shown in FIG. 1, a depth scale 60 is attached the side 14 of the frame 12 which is marked with indicia indicating the desired thickness for the workpiece 30. The depth scale 60 cooperates with a pointer 62 carried by the carriage assembly 24. As the carriage assembly 24 is vertically translated, the location of the pointer 62 on the depth scale 60 indicates the desired thickness of the workpiece 30.

With the additional reference to FIGS. 4 through 6 and with the foregoing description of the exemplary power tool 10 as background, the specific teachings of the present invention which are embodied in an arrangement for adjusting a first component (e.g., the carriage assembly 24) relative to a second component (e.g., the support platen 23) will now be described. In the embodiment illustrated, the arrangement for adjusting the carriage assembly 24 relative to the support platen 23 serves to select depth of cut of the workpiece 30 by selectively moving a workpiece forming element (e.g., the cutting blade 44) vertically relative to the workpiece 30.

To selectively control vertical adjustment of the carriage assembly 24 relative to the support platen 23, the present invention includes first and second drive rods 64 and 66 both including a plurality of external threads 68. The first and second drive rods 64 and 66 pass through apertures 70 formed in upwardly extending boss portions 71 in the casting 26 of the carriage assembly 24. The apertures 70 are formed to include a plurality of internal threads 72 for meshing engagement with the plurality of external threads 68 of the respective drive rod. The first and second drive rods 64 and 66 are similarly formed to include a lower reduced diameter portion 74 which passes through an aperture 76 formed in the base 20. A locking plate 78 having a slot 80 engages a groove 81 formed in the drive rod 64 adjacent the reduced diameter lower portion 74. The locking plates 78 are secured to the base 20 by a suitable fastener 82 and serves to rotatably interconnect the drive rods 64 and 66 to the base 20.

A coil spring 84 surrounds the lower portion of each of the drive rods 64 and 66. The coil springs 84 are operative for producing an upwardly directed force which opposes a substantial portion of the weight of the carriage assembly 24. As a result, a comparable amount of effort is required for vertically advancing the carriage assembly 24 in either of an upward direction or a downward direction.

The first drive rod 64 further includes a reduced diameter upper end 86 which extends through the top 18 of the frame 12 and is secured to a handle assembly 88. In the embodiment illustrated, the handle assembly 88 is shown to include a handle base 92 and a handle proper 94 which is collapsibly interconnected to the handle base 92. An indicator disk 96 is rotatably attached to the top surface of the handle base 92 which is printed with indicia representing carriage assembly travel as a function of handle assembly rotation 88. That is, the indicia provided on the indicator disk 96 is provided in intervals about the perimeter which reflect the amount of vertical travel of the carriage assembly 24 that will be realized upon corresponding rotation of the first drive rod 64 as a function of the thread depth of the drive rod 64. In one application the indicator disk 96 is marked at ninety degree intervals.

With specific reference to FIG. 3, the present invention is shown to include a sprocket arrangement 98 for rotationally interconnecting the first drive rod 64 to the second drive rod 66. The sprocket arrangement 98 includes a drive sprocket 100 attached to the reduced diameter lower end 82 of the first drive rod 64 and a driven sprocket 102 attached to the reduced diameter lower end 82 of the second drive rod 66. A drive chain (partially identified at reference numeral 104) interconnects the drive sprocket 100 and driven sprocket 102. The drive chain 104 also surrounds a conventionally constructed chain tensioning mechanism 106 having a pair of intermediate sprockets 107. The chain tensioning mechanism 106 is secured to the underside of the base 20 with a suitable fastener 108.

With specific reference to FIGS. 4 through 6, the mechanical interconnection between the plurality of external threads 68 of the first drive rod 64 and the plurality of internal threads 72 of the aperture 70 will be described. As will become apparent below, this interconnection includes an anti-backlash arrangement for eliminating the play between the threads 68 and 72 which is otherwise evident upon reversal of movement of the drive rod 64.

The anti-backlash mechanism illustrated is shown to include a biasing member 110 captured between the casting 26 of the carriage assembly 24 and an internally threaded member preferably in the form of a backlash nut 112. The biasing member 110 is preferably a wave spring constructed of metal or other suitable form retaining material. The wave spring 110 is compressible in an axial direction under a predetermined load. Those skilled in the art will readily appreciate that an alternative type of biasing member, including but not limited to coil springs and the like, can be readily incorporated. The wave spring 110 is shown to preferably surround the drive rod. In one application, the radial dimension of the toroidal-shaped wave spring is approximately ⅛ inch.

The backlash nut 112 is formed to include an aperture 114 having a plurality of internally formed threads 116 which engage the external threads 68 of the drive rod 64. A circumferential groove 118 is formed in the underside of the backlash nut 112 adjacent its perimeter which has a width roughly corresponding in dimension to the width of the wave spring 110. At least one retention member, which in the preferred embodiment comprises a pair of shoulder bolts 120, pass through apertures 122 located in the backlash nut 112 and threadably engage apertures 124 formed in the casting 28 of the carriage assembly 24. The shoulder bolts 120 include heads 126 displaced from the backlash nut 112 and function to maintain radially position of the backlash nut 112 while permitting axial movement and axially tolerance removal. It will be appreciated by those skilled in the art that alternative fastening devices, included but not limited to pins and any other known structure capable of accomplishing the stated functions of the shoulder bolts, may be alternatively incorporated. Compression of the wave spring 110 creates a sufficient force between the casting 26 of the carriage assembly 24 and the backlash nut 112 to maintain thread engagement on the outboard side of the threads 68 and 72. As a direct result, actual and perceived cutting error is reduced by establishing immediate response of the carriage assembly 24 upon reversal of rotation of the drive rod 64.

In the embodiment illustrated, a substantially identical anti-backlash arrangement is associated with the mechanical interconnection between the second drive rod 66 and the associated aperture 70 of the casting 26. In the exploded view of FIG. 2, the same reference numerals introduced with respect to the interconnection between the first drive rod 64 and the carriage assembly casting 26 are used to identify equivalent components associated with the second drive rod 66 and the casting 26.

While the above description constitutes the preferred embodiment of the invention, it will be appreciated that the invention is susceptible to modification, variation, and change without departing from the proper scope or fair meaning of the present invention. In this regard, while the various features of the present invention have been shown and described in connection with a portable wood planer, it will be appreciated by those skilled in that art that many of these features are suitable in connection with other power tools.

I claim:

1. An apparatus for adjusting the relative positions of a first component and a second component of a power tool, the first component including an aperture having a plurality of internal threads, the apparatus comprising:

a drive rod rotatable in a first direction and a second direction, said drive rod having a plurality of external threads in meshing engagement with the plurality of internal threads of the first component;

an internally threaded element in meshing engagement with the plurality of external threads; and a biasing member interdisposed between said internally threaded element and the first component, said biasing member in constant biasing engagement with the first component.

2. The apparatus for adjusting the relative positions of a first component and a second component of a power tool of claim 1, wherein rotation of said drive rod in said first direction operates to translate the second component toward the first component and rotation of said drive rod in said second direction operates to translate the second component away from the first component.

3. The apparatus for adjusting the relative positions of a first component and a second component of a power tool of claim 1, wherein said biasing member is operative for maintaining constant contact between the outboard sides of the internal threads of the first component and said external threads of said drive rod.

4. The apparatus for adjusting the relative positions of a first component and a second component of a power tool of claim 1, wherein said internally threaded element comprises a generally cylindrical backlash nut including an underside formed to include a recess for receiving a portion of said biasing member.

5. The apparatus for adjusting the relative positions of a first component and a second component of a power tool of claim 4, further comprising at least one locating member interconnecting said backlash nut and the first component, said at least one locating member operative to maintain the radial position of said backlash nut relative to said drive rod and permit axial movement and axial tolerance removal therebetween.

6. The apparatus for adjusting the relative positions of a first component and a second component of a power tool of claim 1, wherein said biasing member is a wave spring.

7. A tool for carrying out forming operations on a workpiece, the tool comprising:
   a first component for engaging the workpiece;
   a second component disposed vertically relative to said first component;
   one of said first and second components movable relative to the other of said first and second components, said one of said first and second components including an aperture having a plurality of internal threads;
   a workpiece forming element attached to said one of said first and second components;
   a drive rod interconnecting said first and second components, said drive rod including a plurality of external threads in engagement with said plurality of internal threads, said drive rod rotatable in a first direction for vertical translation of said second component to toward said first component and rotatable in a second direction for vertically translation of said second component away from said first component; and
   a biasing member in constant biasing engagement with said one of said first and second components;
   whereby constant contact is maintained between the outboard sides of said plurality of internal threads and said plurality of internal threads as said drive rod is rotated in a first direction and subsequently in a second direction.

8. The tool for carrying out forming operations on a workpiece of claim 7, wherein said one of said first and second components is said second component.

9. The tool for carrying out forming operations on a workpiece of claim 8, wherein said biasing member is operative for biasing said second component towards said first component.

10. The tool for carrying out forming operations on a workpiece of claim 9, further comprising a third component in threaded engagement with said drive rod, said biasing member interdisposed between said second and third components.

11. The tool for carrying out forming operations on a workpiece of claim 10, further comprising at least one locating member interconnecting said third component and the first component, said at least one locating member operative to maintain the radial position of said third component relative to said drive rod and permit axial movement and axial tolerance removal therebetween.

12. The tool for carrying out forming operations on a workpiece of claim 7, wherein said biasing member is a wave spring.

13. A planing machine for planing a surface of a workpiece, the planing machine comprising:
   a carriage assembly including at least one rotatable cutting blade, said carriage assembly further including an aperture having a plurality of internal threads;
   a workpiece support member disposed vertically relative to said carriage assembly so as to define a selectively adjustable workpiece opening therebetween;
   a plurality of vertical support columns interconnecting said carriage assembly and said workpiece support member;
   one of said carriage assembly being slidably mounted to said plurality of support columns for selective bi-directional movement along a path of travel and said workpiece support member slidably mounted to said plurality of support columns for selective bi-directional movement along a path of travel;
   a first drive rod including a plurality of external threads in meshing engagement with the plurality of internal threads, said first drive rod being rotatable in a first direction and a second direction; and
   a biasing member in constant biasing engagement with said carriage assembly such that constant outboard engagement of said internal threads and said external threads is maintained as said first drive rod is rotated in said first and second directions.

14. The planing machine for planing a surface of a workpiece of claim 13, wherein rotation of said drive rod in said first direction causes said carriage assembly to be vertically displaced upward and rotation of said drive rod in said second direction causes said carriage assembly to be displaced vertically downward.

15. The planing machine for planing a surface of a workpiece of claim 13, wherein said biasing member is operative for biasing said carriage assembly towards said workpiece support member.

16. The planing machine for planing a surface of a workpiece of claim 15, further comprising a backlash nut in threaded engagement with said drive rod, said biasing member interdisposed between said backlash nut and said carriage assembly.

17. The planing machine for planing a surface of a workpiece of claim 16, further comprising at least one locating member interconnecting said backlash nut and said carriage assembly, said at least one locating member operative to maintain the radial position of said backlash nut relative to said drive rod and permit axial movement and axial tolerance removal therebetween.

18. The planing machine for planing a surface of a workpiece of claim 13, wherein said first drive rod includes an upper end and a lower end, and further wherein the planing machine includes a manually operable handle assembly interconnected with said upper end.

19. The planing machine for planing a surface of a workpiece of claim 18, further comprising a second drive rod in threaded engagement with said carriage assembly, and further comprising a sprocket arrangement interconnecting said first and second drive rods, whereby rotation of said handle assembly is operative for concurrent rotation of said first and second drive rods.

20. The planing machine for planing a surface of a workpiece of claim 13, wherein said biasing member is a wave spring.

* * * * *